(No Model.)
E. S. REID.
TERMINAL FOR ELECTRIC CABLES.
No. 574,343. Patented Dec. 29, 1896.
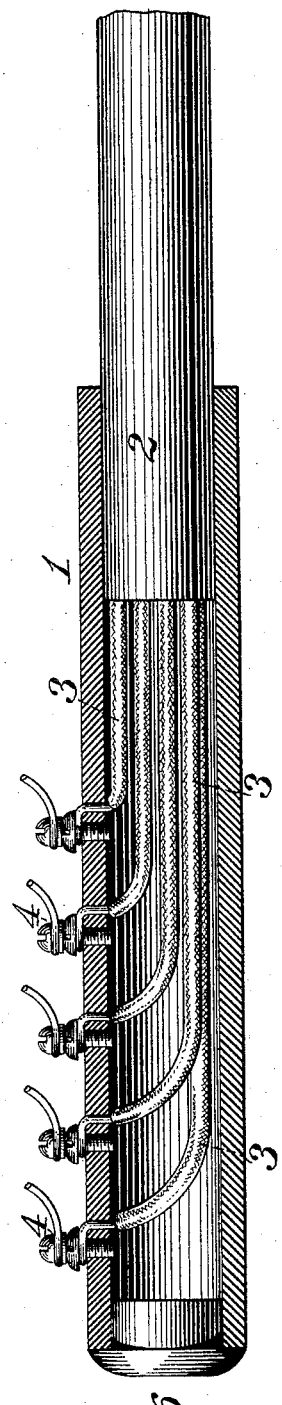
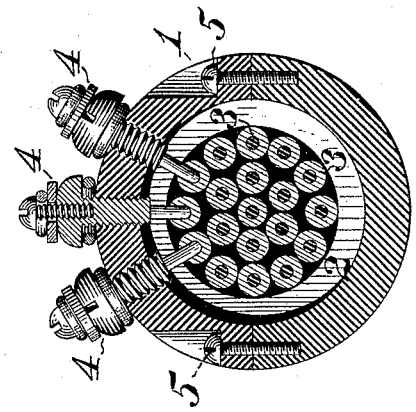
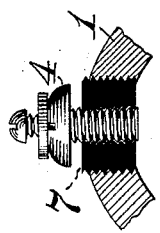
WITNESSES:
Dannie S. Wolcott
F. E. Gaither.
INVENTOR,
Edwin S. Reid,
by George H. Christy
Att'y.

United States Patent Office.

EDWIN S. REID, OF NEW YORK, N. Y., ASSIGNOR TO THE STANDARD UNDERGROUND CABLE COMPANY, OF PITTSBURG, PENNSYLVANIA.

TERMINAL FOR ELECTRIC CABLES.

SPECIFICATION forming part of Letters Patent No. 574,343, dated December 29, 1896.

Application filed March 29, 1892. Serial No. 426,921. (No model.)

*To all whom it may concern:*

Be it known that I, EDWIN S. REID, a citizen of the United States, residing at New York city, in the county of New York and State of New York, have invented or discovered certain new and useful Improvements in Terminals for Electric Cables, of which improvements the following is a specification.

The invention described herein relates to certain improvements in terminals for electric cables. Terminals have heretofore been constructed with an enlarged head, in which the wires in the cable have been spread out and connected to binding-posts outside of the head, and with a contracted portion adapted to fit more or less closely around the cable, it being generally necessary to connect the contracted portion by a wipe-joint to the cable.

The object of the present invention is to provide a terminal whose internal cross-sectional dimensions and shape are the same as the corresponding external dimensions and shape of the cable to which the terminal is to be applied, so that the terminal may closely hug the same, and whose external dimensions do not greatly exceed those of the cable itself.

To this end the invention consists in the construction and combination substantially as hereinafter described and claimed.

In the accompanying drawings, forming a part of this specification, Figure 1 is a longitudinal section of my improved terminal applied to a cable. Fig. 2 is a transverse section of the same, and Fig. 3 is a sectional detail of the same.

In the practice of my invention the terminal 1 is made in the form of a case or shell, of a non-conducting material, having its internal cross-sectional dimensions and shape corresponding with the external cross-sectional dimensions and shape of the cable 2, to which the terminal is to be applied, so that when the case or shell is placed on the end of the cable a tight joint will be formed between them. The shell or case is made of a uniform cross-sectional shape and size, both externally and internally, throughout its entire length, and sufficiently long to provide a proper bearing upon the cable and sufficient space for the proper distribution of the conductors 3 to their binding-posts 4.

For convenience in applying the terminal to the cable and also connecting the wires of the cable to the binding-posts it is preferred to divide the shell or case longitudinally into two parts, as shown. The parts of the case or shell are drawn together around the cable, after the wires have been connected to their binding-posts, by any suitable devices, such as the screws 5. It is also preferred to close the end of the case or shell by a removable plug 6, in order that insulating material may be poured into the portion of the case above the cable.

It will be observed that my improved terminal will occupy but little more space than the cable itself, and that the arrangement of the binding-posts around the sides thereof permits of the use of the terminal on cables containing a large number of wires; and, further, by constructing the terminal so that its internal dimensions and shape correspond to the external dimensions and shape of the cable, the terminal will, when applied to the cable, form a tight joint with the covering of the cable, and as the terminal is of substantially uniform cross-sectional dimensions and shape the coupling pipe or tube heretofore employed for connecting terminals to cables is entirely omitted. When only one, two, or three wires are included in the cable, they may be led out through the end of the terminal, if preferred.

If desired, the case or shell may be formed of metal, in which case plugs 7 of insulating material are secured in the case and the binding-posts 4 are then screwed into the plugs, as shown in Fig. 3.

I am aware that it is old to construct a cable-terminal with a pipe-section or socket of approximately the size of the cable to which the terminal is to be applied and adapted to be slipped over the end of the cable and with an enlarged head or box portion formed independent of the socket and detachably secured thereto. The socket is secured to the sheath of the cable when covered with metal by a wipe-joint of solder, or with a similar joint of insulating material when the cable has a non-metallic covering. The enlarged head consists of four pieces, *i. e.*, a body portion, end pieces, and a longitudinal cover.

Such construction is objectionable as adding materially to the cost of construction and on account of the difficulty of preventing leakage through the numerous joints; also, on account of its size and cumbrous character, it interferes seriously with the compact laying of cables. When cables having enlarged terminal heads are brought to a distributing-point, they cannot be arranged compactly on account of the size of the heads, but must be spread over a considerable area.

I claim herein as my invention—

1. A terminal for electric cables consisting of a case or shell formed in two longitudinal sections, and means for securing said sections together around a cable, the sections being made of substantially uniform cross-sectional shape throughout their entire length and of such internal dimensions as to form a tight joint with the covering of the cable when applied thereto, substantially as set forth.

2. A cable-terminal having a sectional socket portion adapted to fit tightly around the end of the cable, and a sectional head portion formed integral with the socket portion by the regular prolongation thereof, and provided with binding-posts for connection with the wires of the cable and the exterior distributing-wires, substantially as set forth.

In testimony whereof I have hereunto set my hand.

EDWIN S. REID.

Witnesses:
THOMAS F. O'CONNOR,
JAMES R. WILEY.